Sept. 11, 1928.

O. A. BANNER 1,683,752

OIL ENGINE

Filed Feb. 16, 1925      3 Sheets-Sheet 1

INVENTOR.
OTTO A. BANNER
Ralph W. Brown
ATTORNEY.

INVENTOR.
OTTO A. BANNER
BY Ralph W. Brown
ATTORNEY.

INVENTOR.
OTTO A. BANNER
Ralph W. Brown.
ATTORNEY.

Patented Sept. 11, 1928.

1,683,752

UNITED STATES PATENT OFFICE.

OTTO A. BANNER, OF MILWAUKEE, WISCONSIN, ASSIGNOR TO THE FALK CORPORATION, OF MILWAUKEE, WISCONSIN, A CORPORATION OF WISCONSIN.

OIL ENGINE.

Application filed February 16, 1925. Serial No. 9,711.

This invention relates to oil engines.

The problem of effecting a thorough distribution of fuel throughout the body of air contained in the compression chamber has proven a very difficult one, particularly in engines of the solid injection or pump spray type. This is due in part to the limited dimensions of the compression chamber and to the characteristics, both as to form and velocity, of the fuel injection sprays. This difficulty is aggravated by the brevity of the time interval in which such distribution and mixture must occur.

Various attempts have heretofore been made, both in this country and abroad, to find a solution for this problem, among which may be mentioned those in which use is made of convergent or opposed fuel sprays which meet in the center of the chamber to form a ball or cloud of fuel mist. The velocity of the injected fuel particles is thus materially reduced, but such methods are successful, however, only to the extent to which the clouds of fuel mist thus formed are disbursed throughout the chamber.

The general aim of the present invention is the provision of an oil engine in which a more thorough and complete distribution of the fuel throughout the body of air in the compression chamber may be had. This is accomplished by the use of a compression chamber having eccentrically arranged, spacious air chambers, and by so introducing the fuel as to provide a cloud of finely divided fuel mist suspended in and permeating the air in each chamber.

Other objects and advantages will hereinafter appear.

Figure 1:
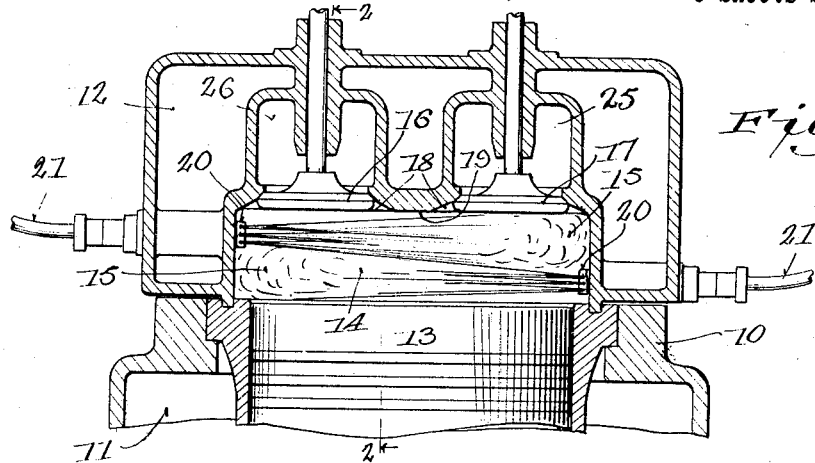
Figure 1 is a fragmentary sectional view of an engine constructed in accordance with the present invention.

The engine selected for illustration is of the solid injection or pump spray type. It comprises one or more cylinders 10, water-jacketed in the usual manner, as indicated at 11, and provided with a water-jacketed cylinder head 12. The piston 13 of usual construction is shown in the position which it normally assumes just prior to or at compression dead center.

The compression chamber 14 is of an elongated form extending transversely of the cylinder, the bottom thereof being bounded by the end face of the piston. Oval or egg shaped compression chambers of elongated form are not new. In the engine shown, however, it will be noted that the end portions of the compression chamber are substantially as wide as the intermediate or central portions, so that spacious air pockets or chambers 15 are provided eccentrically of the cylinder. A compression chamber having the characteristics just mentioned is believed to be new. The elongated form of compression chamber permits the mounting of the air intake and exhaust valves 16 and 17 in parallel relation in the cylinder head where they may be conveniently actuated by a single cam shaft. These valves are shown countersunk in recesses 18 formed in the top wall 19 of the compression chamber so that they will not interfere with the fuel sprays to be later described, and so as to avoid accumulation of fuel thereon.

Figure 2:
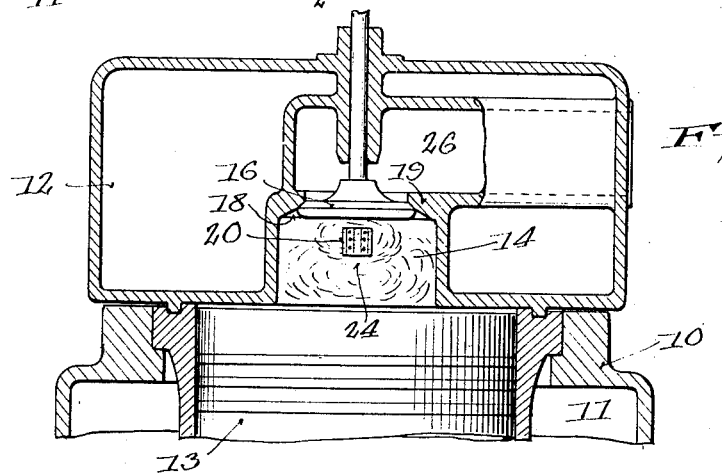
Figure 2 is a sectional view taken substantially on the line 2—2 of Figure 1.
Figure 3:
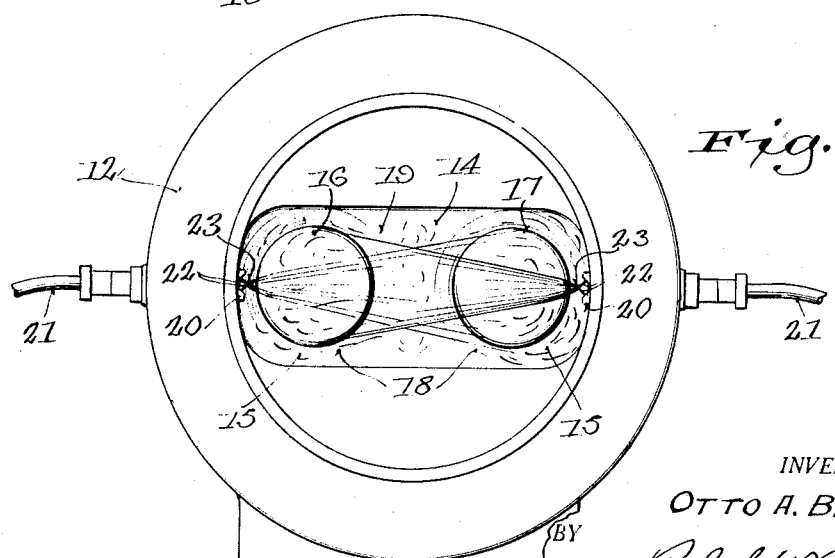
Figure 3 is a bottom plan view of the cylinder head removed from the engine of Figures 1 and 2.

The air pockets or chambers 15 are filled with clouds of fuel mist by separate fuel sprays directed in opposite directions transversely of the cylinder and preferably arranged to project across the central portion of the compression chamber. In the engine shown in Figures 1 to 3 the fuel is introduced through two injection nozzles 20 of the solid injection type capable of producing substantially flat fuel sprays. Since such nozzles are old and well known in the art, a detailed description thereof is deemed unnecessary. Two such nozzles are shown in vertically offset relation and in opposite ends of the chamber. The arrangement is such that each end portion of pocket 15 of the compression chamber is filled with fuel mist delivered from a nozzle in the opposite end wall of the chamber. Thus, although the spray from each nozzle passes through the central portion of the chamber, they only partially intersect, as at 24, and thus provide only a limited supply of fuel in the central portion, the majority of the fuel passing on into an end portion or pocket 15. The length of the chamber and the relatively low velocity of the fuel particles prevent their being thrown on the end walls of the chamber. Thus the entire air in the chamber is substantially saturated with the fuel mist by a thorough distribution thereof.

In operation, the fuel is forced through the two nozzles simultaneously by a sudden ram like action immediately prior to the end of the compression stroke. The thorough mixture of air and fuel thus produced is then ignited, either by the heat of compression or otherwise, and the piston begins its working stroke. On the exhaust stroke the products of combustion are expelled in the usual manner through the exhaust port 25 and a new charge of air is drawn in in the usual manner through the inlet port 26 during the suction stroke.

Figure 4:
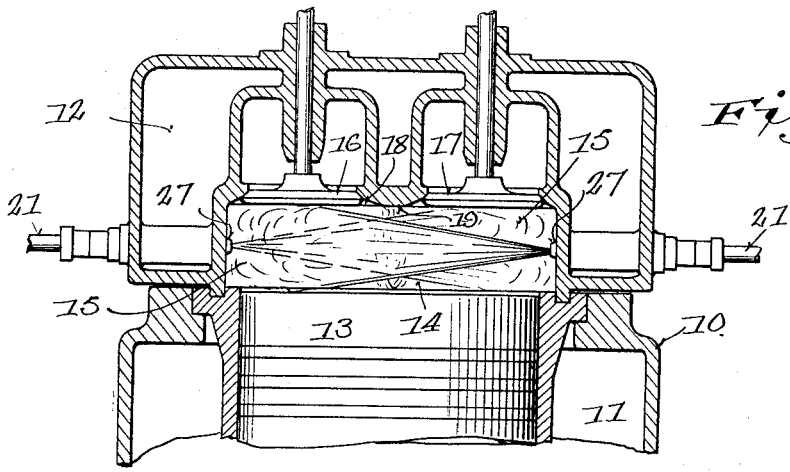
Figures 4, 5 and 6 are views similar to Figures 1, 2 and 3, respectively, illustrating a somewhat different method of introducing the fuel.
Figure 5:
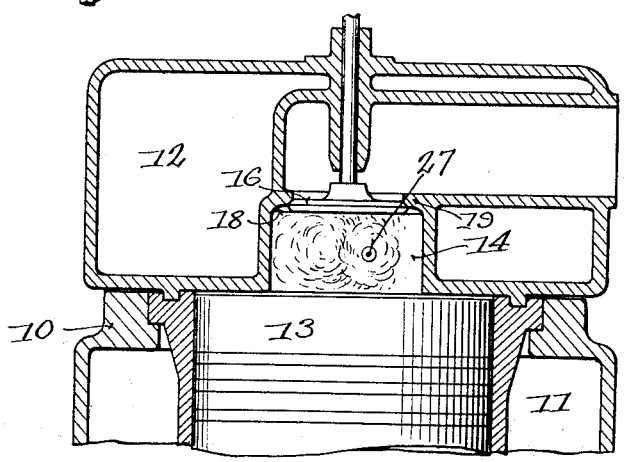
Figure 6:
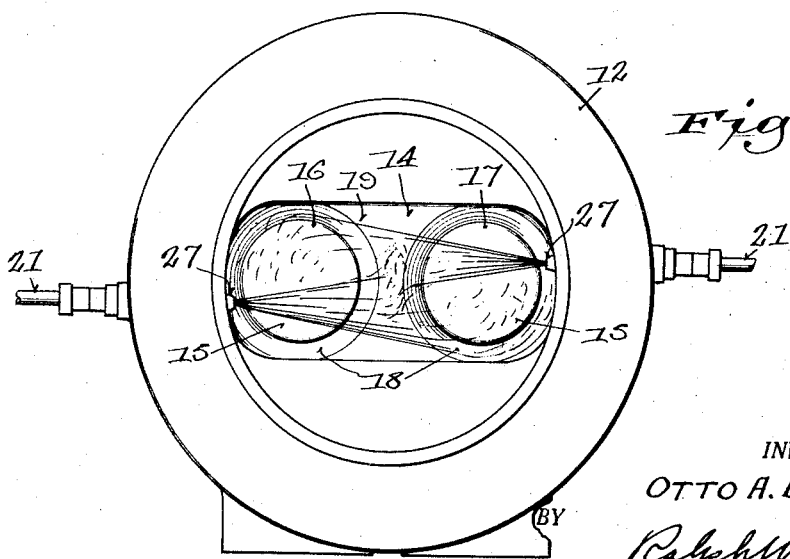

The engine illustrated in Figures 4 to 6 is similar to that just described, the fuel being admitted through two nozzles 27 from which fuel sprays are directed into the eccentric air pockets 15 in the compression chamber. These nozzles are of a well known type and need not be described, suffice it to say that each produces a substantially conical fuel spray through a single dicharge duct (not shown). These nozzles are mounted in laterally offset position in opposite end walls of the compression chamber so as to produce oppositely directed parallel fuel sprays which pass through the central portion of the chamber but only partially intersect. As in the engine above described, only a small portion of each spray remains in the central portion of the chamber, the remaining portion passing on into the opposite end portions or pockets 15.

Figure 7:
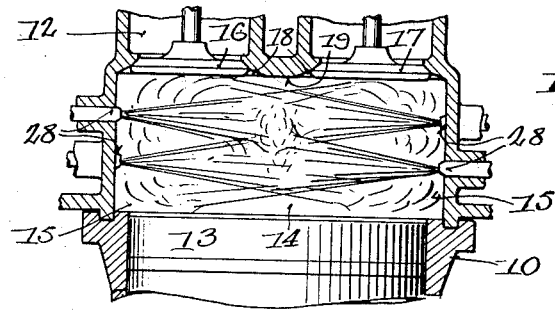
Figures 7, 8 and 9 are views similar to Figures 1, 2 and 3, respectively, illustrating still another method of introducing the fuel.
Figure 8:
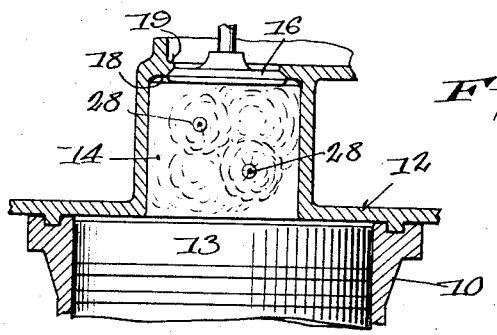
Figure 9:
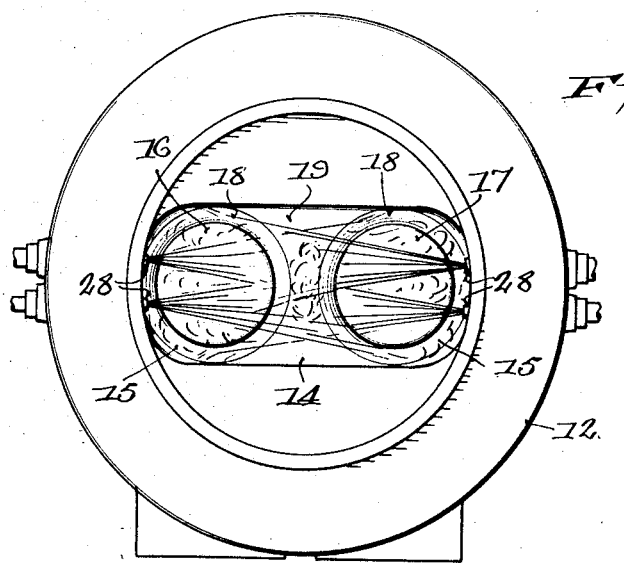

In the engine shown in Figures 7 to 9, a plurality of nozzles 28 are provided in each end wall of the chamber. Each is similar to the nozzles 27. These nozzles are arranged in oppositely inclined, diagonal pairs so that the sprays produced by the pair in one end of the chamber only partially intersect the sprays produced by the other pair. The effect is similar to that above described, in that most of the fuel is delivered into the end portions of the compression chamber. The number and arrangement of the nozzles employed will vary with the size and other characteristics of the engine.

Various changes may be made in any of the embodiments of the invention above specifically described, without departing from or sacrificing any of the advantages of the invention, as defined in the appended claims.

I claim:

1. In an oil engine an engine cylinder having an elongated transversely extending compression chamber therein shaped to provide relatively wide air pockets at the opposite ends thereof, and a plurality of fuel injection nozzles at the opposite end of said chamber, each nozzle being so disposed as to project a fuel spray thru said chamber into one of said pockets at the far end thereof.

2. In an oil engine a cylinder having an elongated transversely extending compression chamber therein, and a fuel injection nozzle at each end of said chamber, each nozzle being so disposed as to direct a fuel spray lengthwise of said chamber to form a cloud of fuel mist in the further end thereof.

3. In an oil engine an engine cylinder having an elongated transversely extending compression chamber therein, means for cooling the walls of said chamber and means including offset fuel injection nozzles in the ends of said chamber for producing fuel sprays extending longitudinally thereof.

4. In an oil engine an engine cylinder having an elongated transversely extending compression chamber therein, means for cooling the walls of said chamber and means including vertically offset fuel injection nozzles in the ends of said chamber for producing fuel sprays extending longitudinally thereof.

5. In an oil engine an engine cylinder having an elongated transversely extending compression chamber therein, means for cooling the walls of said chamber and a plurality of fuel injection nozzles at the opposite ends of said chamber arranged to produce a plurality of oppositely directed partially intersecting fuel sprays substantially longitudinally of said chamber.

6. In an oil engine an engine cylinder having an elongated transversely extending compression chamber therein, means for cooling the walls of said chamber, and a plurality of fuel injection nozzles at the opposite ends of said chamber arranged to produce a plurality of oppositely directed offset fuel sprays substantially longitudinally of said chamber.

7. In an oil engine an engine cylinder having an elongated transversely extending compression chamber therein, means for cooling the walls of said chamber, and a plurality of fuel injection nozzles at the opposite ends of said chamber arranged to project a plurality of oppositely directed fuel sprays through an intermediate portion of said chamber.

In witness whereof, I hereunto subscribe my name this 5th day of February, 1925.

OTTO A. BANNER.